Oct. 28, 1969  J. E. CAREY  3,474,834
SANDWICH PIPE

Filed Feb. 8, 1966  2 Sheets-Sheet 1

INVENTOR:
JAMES E. CAREY
BY: *Oswald H. Milmore*
HIS ATTORNEY

Oct. 28, 1969     J. E. CAREY     3,474,834
SANDWICH PIPE

Filed Feb. 2, 1966     2 Sheets-Sheet 2

INVENTOR:
JAMES E. CAREY
BY: *Oswald 7d Milmore*
HIS ATTORNEY

# United States Patent Office 3,474,834
Patented Oct. 28, 1969

3,474,834
SANDWICH PIPE
James E. Carey, Millburn, N.J., assignor to Shell Oil
Company, New York, N.Y., a corporation of Delaware
Filed Feb. 8, 1966, Ser. No. 525,898
Int. Cl. F16j 15/00; F16l 9/00, 13/14
U.S. Cl. 138—140                           3 Claims

ABSTRACT OF THE DISCLOSURE

A pipeline formed of a series of uniform pipe sections, each section being formed of inner and outer concentric tubular shells having a load-bearing, high-density material therebetween and joined to an adjacent section by a stepped ring which serves to concentrically align the shells and also to connect and seal adjacent sections.

---

This invention relates to a conduit for transporting or storing flowable materials. More particularly, this invention relates to a composite conduit or pipe made of several components which are assembled as the pipe is installed.

In recent years, the transport and conservation of water resources as well as the transport and storage of a great variety of flowable materials have become increasingly important. It has necessitated a constant drive to cut down the manufacturing, shipping and installation costs for providing pipeline systems. The term pipeline as used herein is meant to include the use of pipeline sections in constructing storage facilities. For the most part, pipelines are assembled from heavy steel or steel reinforced concrete pipe sections which are manufactured by well-known methods, such as welding cylindrically bent sheets or casting, often formed at a plant and then shipped to the site of the pipeline. While steel is usually the most desirable of all materials widely used for the manufacturing of line pipe, there are conditions where its shortcomings are so obvious and it is so costly that much experimental work is being done to find an adequate substitute. Under corrosive flow conditions, pipelines constructed of ferrous metals are destroyed by internal corrosion. External corrosion also damages such pipelines, especially where they are installed in marshy terrain having a high acid content. To overcome these handicaps inherent in ferrous metals under corrosive conditions and to develop new pipeline materials, various installations have been tried, including aluminum pipe, plastic pipe, steel pipe with plastic lining, and steel pipe with linings and coverings of concrete. While some of these have advantages that the others do not have, all have certain disadvantages.

While concrete is often used as a corrosion protective liner and over coating for steel "cylinder wall" pipe, the concrete performs an additional function as a collapse resisting member when the pipe is subjected to earth or water overburden. Collapse resistance is a design factor which must be considered in all large diameter pipes, since none of the above materials would show adequate collapse resistance if wall thickness were designed for minimum and safe resistance of internal pressure loading.

The problem is to develop a pipeline system which utilizes light-weight materials and reduces shipping costs from the manufacturing plant to the pipeline site, which is relatively simple and easy to install, and which has enough strength when installed to operate under high pressure and at the same time enough collapse resistance and weight to remain in position to provide a stable underground or underwater installation.

The present invention provides such a pipeline system and is directed to both the method of constructing such a pipeline and the pipe itself. The pipe comprises two light-weight, tubular shells as the inner and outer walls of a sandwich pipe construction, the space between the shells being filled with a fluent, body-forming material, such as concrete, after installation of the pipe to form a collapse-resistant composite. These shells may, for example, be formed of glass fiber reinforced thermosetting resins, glass fiber reinforced thermoplastics, unreinforced thermoplastics, plastic coated metal skins, or uncoated metal skins. The walls are tapered to allow nesting during shipment, e.g., to permit several lengths of like shells to be shipped in the length of two single lengths, Additionally, a group of nested smaller-diameter inner shells can be shipped inside the nested larger diameter outer shells to reduce required shipping space still further. Adjacent sections of pipe are joined by a stepped joining ring which both centers the concentric walls and seals the connection between pipe sections.

The method of the invention for constructing such a pipeline is relatively simple. The tapered walls are shipped in compact, nested form as previously described to the site where the pipeline is to be constructed. Upon separating the nested walls, each smaller-diameter inner wall is positioned within a corresponding larger-diameter outer wall to form a section of the pipeline. When in position, sections of the pipeline are connected and sealed with the stepped joining rings, the inner and outer walls being positioned concentrically by such rings leaving a uniform annular space therebetween. A fluent, body-forming material, such as concrete, sand, or a plastic foam grout, is then pumped into the annular space through holes in the outer wall to create the core of the sandwich. When this material cures and hardens, a strong composite pipeline is formed, capable of handling high pressure flows and resisting external and overburden loading.

The invention will be further described with reference to the drawings, wherein.

Figure 1:
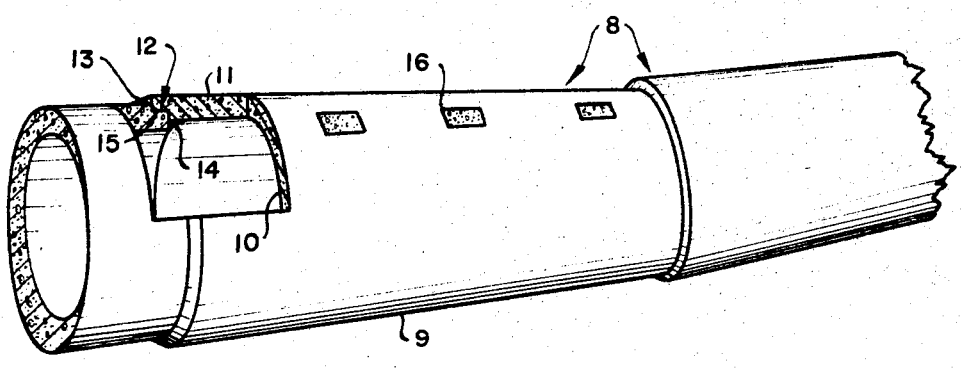
FIGURE 1 is a schematic perspective view of a pipeline according to the invention with a part of the seal shown in section.

Referring now to the drawings in detail, FIGURE 1 shows a series of pipe sections 8 joined together. Each pipe section includes a tapered outer wall 9 and a tapered inner wall 10. These walls 9 and 10 are made from a suitable material, such as glass fiber reinforced thermosetting resins, glass fiber reinforced thermoplastics, unreinforced thermoplastics, plastic coated metal skins, or uncoated metal skins. Filling the annular space between these two walls of the pipe section is a body-forming material, such as concrete 11. A stepped joining ring 12 serves as a centering means, i.e., as a connection between adjacent pipe sections 8 to both center the inner and outer walls of the section, to provide movement at the joints and to seal the joint to prevent leakage from the pipeline. Each joining ring 12 comprises two sealing portions 13 and 14 joined by a stepped carrier ring member 15, best shown in FIGURE 2.

Figure 2:
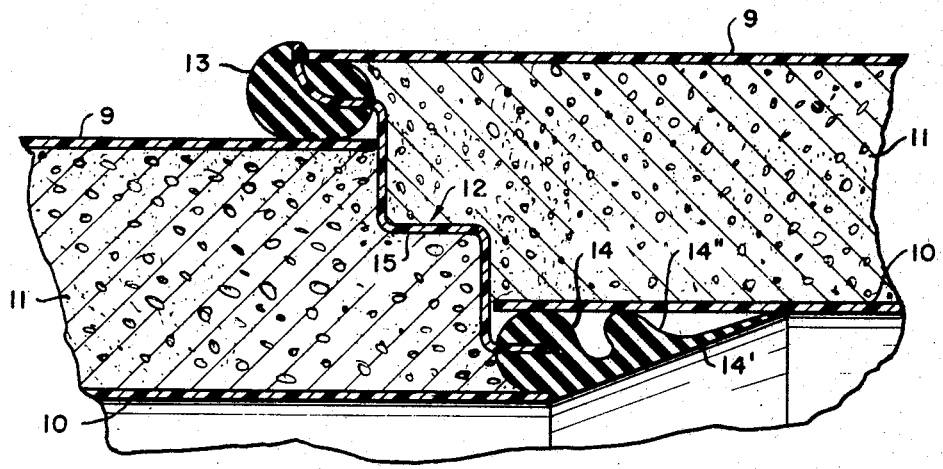
FIGURE 2 is an enlarged detailed view of the portion of FIGURE 1 shown in section.
Figure 3:
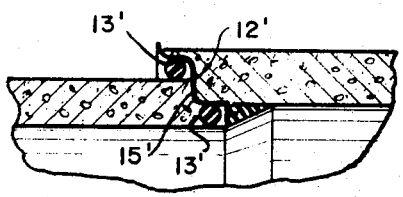
FIGURE 3 is a detailed view of an alternative sealing arrangement.

The outer sealing portion 13 can be of almost any suitable configuration to effectively seal the overlapping connection of the outer pipe walls 9, the larger end of one tapered outer wall concentrically overlapping and enclosing the smaller end of the adjacent outer wall as shown. The sealing portion 14 is designed to fit within the annulus between overlapping portions of adjacent tapered inner walls and preferably includes a tapered portion that provides a smooth continuous surface 14' between the smaller end of the first inner pipe and a point far enough down the inside of the larger portion of the adjacent inner pipe to create a gradual incline therebetween. A peripheral bead 14'' may be provided to maintain the shape of the tapered portion. The purpose for designing the seal 14 with a slightly inclined or tapered surface 14' is to provide a gradual change in flowpath for the flowable materials which are to be passed through the pipeline by counteracting excessive turbulence in flow which would normally occur if a simple 90° drop were allowed at the step. The construction shown in FIGURE 2 uses elastomer, e.g., rubber, sealing rings 13 and 14 built onto a fiberglass reinforced stepped carrier ring member 15 to form a sealed but slightly flexible coupling between adjacent pipe sections 8. An alternative sealing arrangement to that shown in FIGURE 2 is shown in FIGURE 3 wherein stepped sealing ring 12' includes a stepped carrier ring member 15' and two single round O-rings 13' in sealing engagement therewith. A unitary stepped sealing ring cast entirely from a suitable plastic material, e.g., polyurethane elastomers using an epoxy resin based curing agent, can also be used. Such a flexible unitary ring 12a is illustrated in FIGURES 4 through 7.

Figure 4:
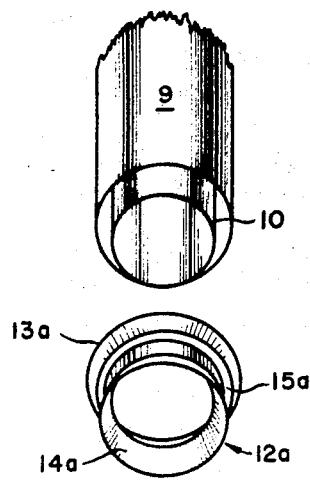
FIGURE 4 is a perspective end view of a section of pipe in position ready to receive the stepped sealing ring, which appears in the foreground.
Figure 5:
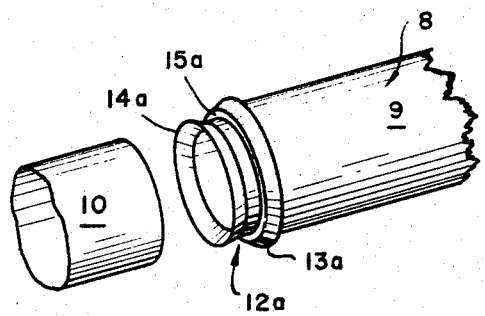
FIGURE 5 is a perspective plan view of the sealing ring in position about to receive an adjacent inner wall, which appears at the left.
Figure 6:
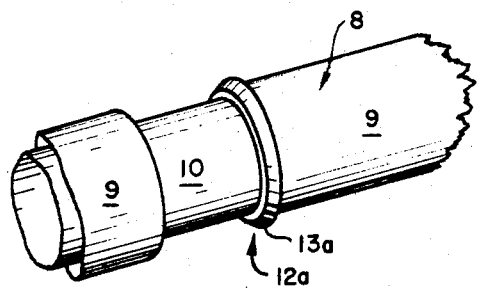
FIGURE 6 is a perspective view of the adjacent inner wall in place, the assembly about to receive the adjacent outer wall.
Figure 7:
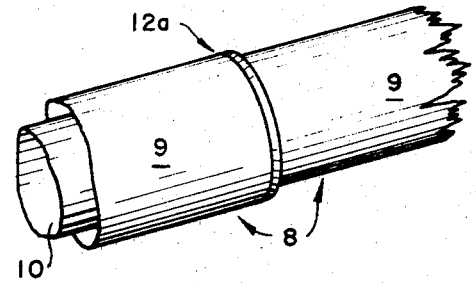
FIGURE 7 is a perspective view of a completed joint between adjacent pipeline sections; and, FIGURE 8 is a schematic perspective view of the tapered walls of the pipeline in a nested arrangement.

In FIGURES 4 through 7 are shown progressive steps in the assembling of two adjacent pipeline sections. To form a single section 8, an inner wall 10 is placed within a corresponding outer wall 9 as shown in FIGURE 4. When the inner wall is in place within a corresponding outer wall so that the smaller-diameter end of the inner wall protrudes slightly from the outer wall, a stepped sealing ring 12a, which may be of the unitary type previously described having an outer sealing portion 13a and an inner sealing portion 14a, is installed over the smaller end of a first tapered outer wall as shown in FIGURE 5 (which is reversed from FIGURES 1 and 2). The central protruding portion 14a of the flexible ring forms an opening which receives the smaller end of a first tapered inner wall of the pipe which protrudes from within the first outer wall just mentioned and serves as a seal between adjacent inner walls. The stepped sealing ring 12a also serves to concentrically align the inner pipe wall within the outer wall forming a closed uniform annular space therebetween. The larger end of an adjacent second inner wall 10, shown in FIGURE 5 separated from the pipe section 8 just assembled, slides over the central protruding portion 14a of the flexible ring 12a to form a fluid-tight seal between adjacent inner walls. The central protruding portion 14a of the flexible ring is designed with a slight inclined portion to provide a smooth flow path between adjacent inner walls for the material flowing therethrough as previously described. FIGURE 6 shows the larger end of the adjacent second inner wall 10 in place with the larger end of an adjacent second outer wall 9 in position to be slid over the outer lip 13a of the flexible sealing ring 12a to form a fluid-tight seal between adjacent outer walls 9. FIGURE 7 shows the larger end of the adjacent second outer wall in position to complete the connection between the two adjacent pipe sections, the sealing ring 12a establishing a uniform annular space between the inner and outer walls of the newly-formed pipe section. The same process is repeated to join successive sections until a pipeline of desired length has been completed.

The outer walls of the pipe sections are provided with openings 16 shown in FIGURE 1 for pouring concrete into the individual uniform annular spaces formed by the concentric inner and outer walls of a pipe section and the connecting portions 15, 15' or 15a of the sealing rings 12, 12' or 12a, which are in place at both ends of each pipe section. However, it is not necessary that connecting portions 15, 15' or 15a be completely closed. It may be desirable to provide holes therein through which the concrete can pass to form a further connecting means between adjacent pipe sections. To prevent the inner wall of the pipe from collapsing during pouring and initial setting of the concrete, it is necessary to provide a support therefor, such as inflatable bags or molds (not shown) which are already in use for casting concrete drainage conduits. The bags are inflated to support the weight of the wet concrete and are thereafter deflated and moved along the conduit trench as soon as the fresh cast concrete can support itself.

A particularly suitable application for this new pipe structure and method for constructing such a pipeline is to form large-diameter pipe for service at pressures in the range of 150 to 300 p.s.i. The inside wall of the pipe is designed to withstand the pressure of fluid being transported, whereas the total sandwich structure, composed of the two walls and concrete core, will operate to resist forces of collapse and bending which such a pipe must withstand. The outer wall may, in one embodiment, be only about 0.050 inch in thickness whereas the inner wall will be dimensioned to resist specific pressures at given diameters. For example, a 36-inch diameter inner wall operating at 150 p.s.i. would have to be one-tenth (0.10) of an inch thick to operate at a three-fold safety factor when glass fiber reinforced epoxy resin walls are used.

Figure 8:
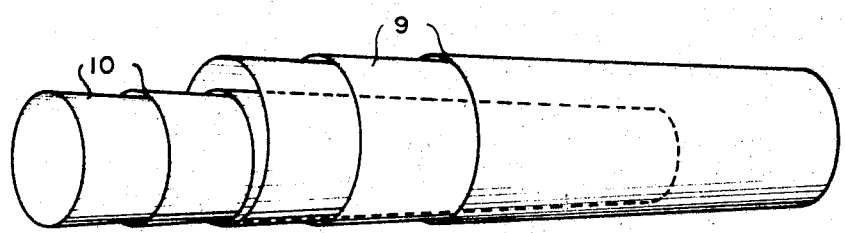

The method of nesting the tapered walls of the pipeline for shipment to the installation site is shown in FIGURE 8. Three of the larger, tapered outer walls are shown nested together, as are three smaller, tapered inner walls. The nested inner walls can then be shipped within the nested outer walls, greatly reducing the amount of shipping space required over that required for conventional pipes. The taper may be such that approximately ten walls of either size can be shipped in the length of two such pipe walls.

It should be apparent that other forms of pipeline sections than just straight sections can be constructed by such a sandwich construction, e.g., elbow and T-sections can also be made. Thus, it is possible to provide branch lines for a straight pipeline as well as a closed loop for storage purposes. Additionally, by enclosing the two open ends of a pipeline comprising any number of joined pipeline sections, a straight pipeline storage facility can be constructed.

What has been shown and described is a novel pipe and pipeline construction method, each section of pipe consisting of two light-weight, tapered shells forming the inner and outer walls of a sandwich construction; sealing rings at each end of the section concentrically aligning the inner and outer walls to form a uniform annular space therebetween; and body-forming material filling the annular space to form a composite high-strength pipeline structure, such material being poured into the annular space at the site of installation after the walls and sealing rings have been assembled. Any obvious variations of the disclosed structure and method are intended to be covered by the following claims.

I claim as my invention:

1. A pipeline for flowable materials formed by a series of uniform pipe sections,
    (a) each section comprising:
        (1) a first enlongated tubular shell tapered from one end to the other forming the inner wall of a pipe section;
        (2) a second elongated tubular shell tapered from one end to the other forming the outer wall of the pipe section, said second shell having the same length as the first shell, but having a larger diameter so that said first shell can fit within said second shell and leave an annular space therebetween;

(3) a load-bearing, high-strength material filling said annular space to form a composite pipe wall construction with said first and second shells, said second tubular shell being formed with at least one opening in the wall thereof to permit the introduction of said material into said annular space; and (b) stepped ring means attachable to the common ends of said shells for maintaining said shells in concentric alignment, said ring means being adapted to connectibly receive and maintain the common ends of the shells of an adjacent terminally juxtaposed pipe section in concentric alignment, and said ring means including sealing means for sealing said pipe sections in fluid tight relationships whereby the larger end of one unitary pipe section is joined to the smaller end of an adjacent pipe section by said stepped ring means.

2. A conduit as defined in claim 1 wherein said high-strength material is concrete.

3. A pipeline as defined in claim 1 wherein said first and second elongated shells are glass fiber reinforced plastic material.

References Cited

UNITED STATES PATENTS

| | | | |
|---|---|---|---|
| 170,476 | 11/1875 | Jennings | 285—382.2 |
| 3,189,371 | 6/1965 | Swan | 138—149 X |
| 3,307,590 | 3/1967 | Carlson | 138—149 |
| 3,379,221 | 4/1968 | Harry et al. | 138—172 X |

FOREIGN PATENTS

| | | |
|---|---|---|
| 1,327,676 | 4/1963 | France. |

LAVERNE D. GEIGER, Primary Examiner

E. J. EARLS, Assistant Examiner

U.S. Cl. X.R.

138—155